(12) United States Patent
Gaboury

(10) Patent No.: US 6,466,055 B1
(45) Date of Patent: Oct. 15, 2002

(54) INTEGRATED CIRCUIT BUFFER SYSTEM

(75) Inventor: Michael Joseph Gaboury, Burnsville, MN (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/882,557

(22) Filed: Jun. 15, 2001

(51) Int. Cl.$^7$ .......................................... H03K 19/0175
(52) U.S. Cl. .......................................... 326/83; 326/87
(58) Field of Search .............................. 326/83, 86, 87, 326/89, 90, 91, 115, 126

(56) References Cited

U.S. PATENT DOCUMENTS

| | | | | |
|---|---|---|---|---|
| 4,553,052 | A | * 11/1985 | Takahashi | 326/83 |
| 5,955,896 | A | * 9/1999 | Horiguchi et al. | 326/83 |
| 6,320,441 | B1 | * 11/2001 | Fletcher et al. | |
| 6,339,344 | B1 | * 1/2002 | Sakata et al. | 326/83 |

* cited by examiner

*Primary Examiner*—Don Phu Le
(74) *Attorney, Agent, or Firm*—Fogg, Slifer & Polglaze; H. C. Chan

(57) ABSTRACT

An integrated circuit input buffer system includes numerous buffers used to receive input signals. The buffer system controls the buffers in a manner that places some of the buffers in a standby mode while other buffers are active. The integrated circuit input buffer system reduces the capacitive load on any individual buffer. The buffers can be activated in a variety of patters, such as sequential activation. In one embodiment, the buffers have differential transistors coupled to receive differential input signals. The differential transistors are coupled to conduct a total current defined by a tail current circuit. The buffers are placed in a standby state by electrically isolating the tail current from the differential transistors. In one embodiment, a standby transistor is electrically located between the differential transistors and a tail current transistor. The differential transistors conduct a trickle current during the standby state. Sample-and-hold circuitry is electrically coupled to the buffers to process the input signals.

17 Claims, 6 Drawing Sheets

INTEGRATED CIRCUIT BUFFER SYSTEM

TECHNICAL FIELD OF THE INVENTION

The present invention relates generally to buffer circuitry, and in particular the present invention relates to an integrated circuit low power/high speed buffer circuit.

BACKGROUND OF THE INVENTION

Integrated circuits are often used to process externally provided analog or digital signals. A receiver circuit of the integrated circuit typically processes these signals. The receiver is coupled to an input connection and can receive data in a variety of different speeds. The receiver circuit can include input buffer circuits to receive the external signal. The buffer circuit can be a transistor that drives the data to internal circuitry. One type of integrated circuit receiver uses numerous sample-and-hold circuits to process high-speed analog data signals provided through a buffer circuit. For example, ten sample circuits are coupled to an input connection via a common buffer. The sample circuits are offset in phase, such that they each capture the input signal at a different time. The sample-and-hold circuitry can be viewed as a load capacitance being driven by the input buffer. As such, a greater sample-and-hold circuit population increases the load capacitance. Increasing the load capacitance results in a compromise between increased power and decreased operating speed.

For the reasons stated above, and for other reasons stated below which will become apparent to those skilled in the art upon reading and understanding the present specification, there is a need in the art for a high-speed input circuit that reduces an effective input load capacitance.

SUMMARY OF THE INVENTION

The above-mentioned problems with integrated circuit input buffers and other problems are addressed by the present invention and will be understood by reading and studying the following specification.

In one embodiment, an integrated circuit comprises input connections to receive first and second input signals, a plurality of buffer circuits coupled to the input connections, a plurality of sample circuits each coupled to one of the plurality of buffer circuits, and control circuitry coupled to the plurality of buffer circuits to selectively place some of the plurality of buffer circuits in a standby state.

In another embodiment an integrated circuit comprises differential input connections to receive first and second input signals, electrostatic discharge protection circuitry coupled to the differential input connections, and first and second buffer circuits coupled to the differential input connections. First and second sample circuits are respectively coupled to the first and second buffer circuits. Control circuitry coupled to the first and second buffer circuits selectively places either the first or second buffer circuit in a standby state.

A method of operating an integrated circuit input buffer circuit comprises receiving differential input signals on input connections, activating a first buffer circuit coupled to the input connections, and placing a second buffer circuit, coupled to the input connections, in a standby state. A current conducted by the second buffer circuit is less than a current conducted by the first buffer circuit.

Another method of operating an integrated circuit input buffer circuit comprises receiving differential input signals on input connections, coupling the differential input signals to a plurality of buffer circuits, and sequentially activating at least one of the plurality of buffer circuits. The remaining ones of the plurality of buffer circuits are placed in a standby state. A standby current conducted by the buffer circuits in the standby state is less than an operating current conducted by the activated buffer circuits.

DETAILED DESCRIPTION OF THE INVENTION

In the following detailed description of the preferred embodiments, reference is made to the accompanying drawings that form a part hereof, and in which is shown, by way of illustration, specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

Figure 1:
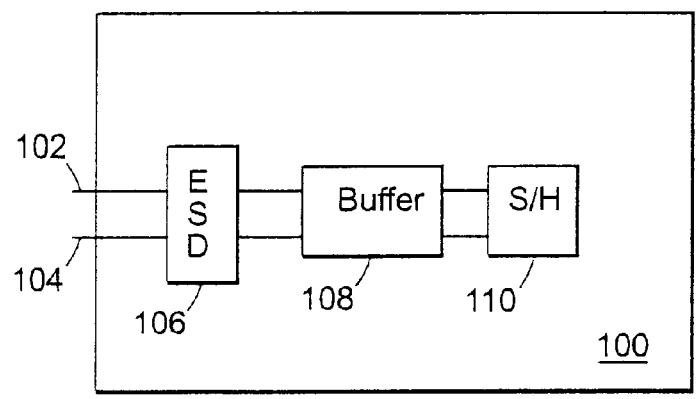
FIG. 1 is a simplified overview of input circuitry of an integrated circuit.

One embodiment of the present invention provides multiple sample circuits that are systematically activated to reduce total load capacitance of input circuitry. Referring to FIG. 1, a simplified overview of input circuitry of the present invention embodiment, an integrated circuit 100 is described. The integrated circuit includes multiple input connections 102 and 104 for receiving externally provided signals, such as data signals. The data signals are analog differential signals having a frequency range of up to about 5 GHz, but not limited thereto. The input connections are coupled to electrostatic discharge (ESD) protection 106. As known in the art, ESD protection provides a controlled discharge path for undesired high voltage signals. The ESD circuit is typically placed near the input connection to protect input buffer circuitry 108. Input buffer circuitry is coupled to the input connections to process the signals and provide output signals having sufficient power to drive inputs of sample-and-hold circuitry 110. Additional processing circuitry is coupled to an output from the sample-and-hold circuit.

Figure 2A:
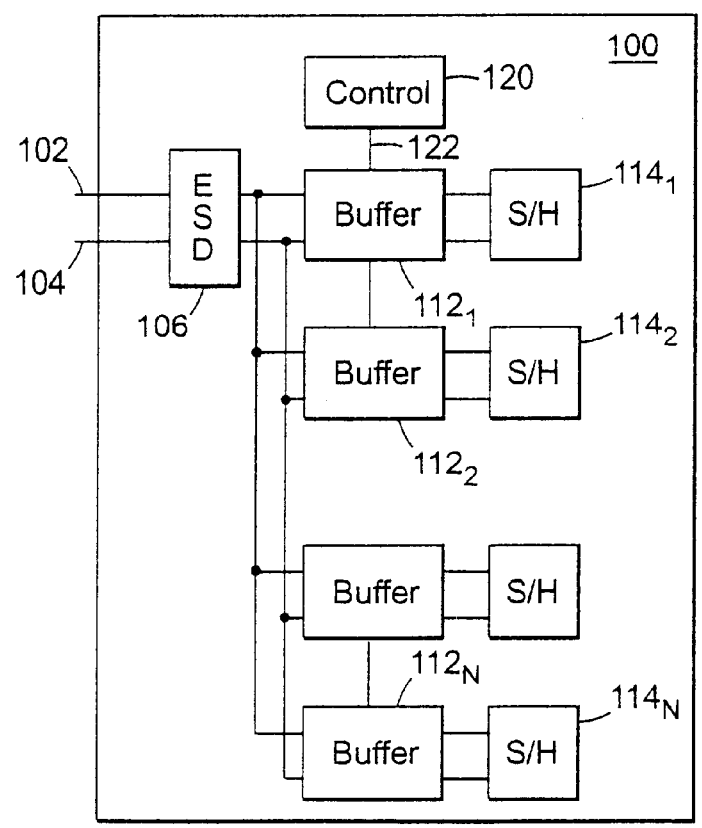
FIG. 2A is a more detailed illustration of the input buffers of FIG. 1 and corresponding sample circuits.
Figure 2B:
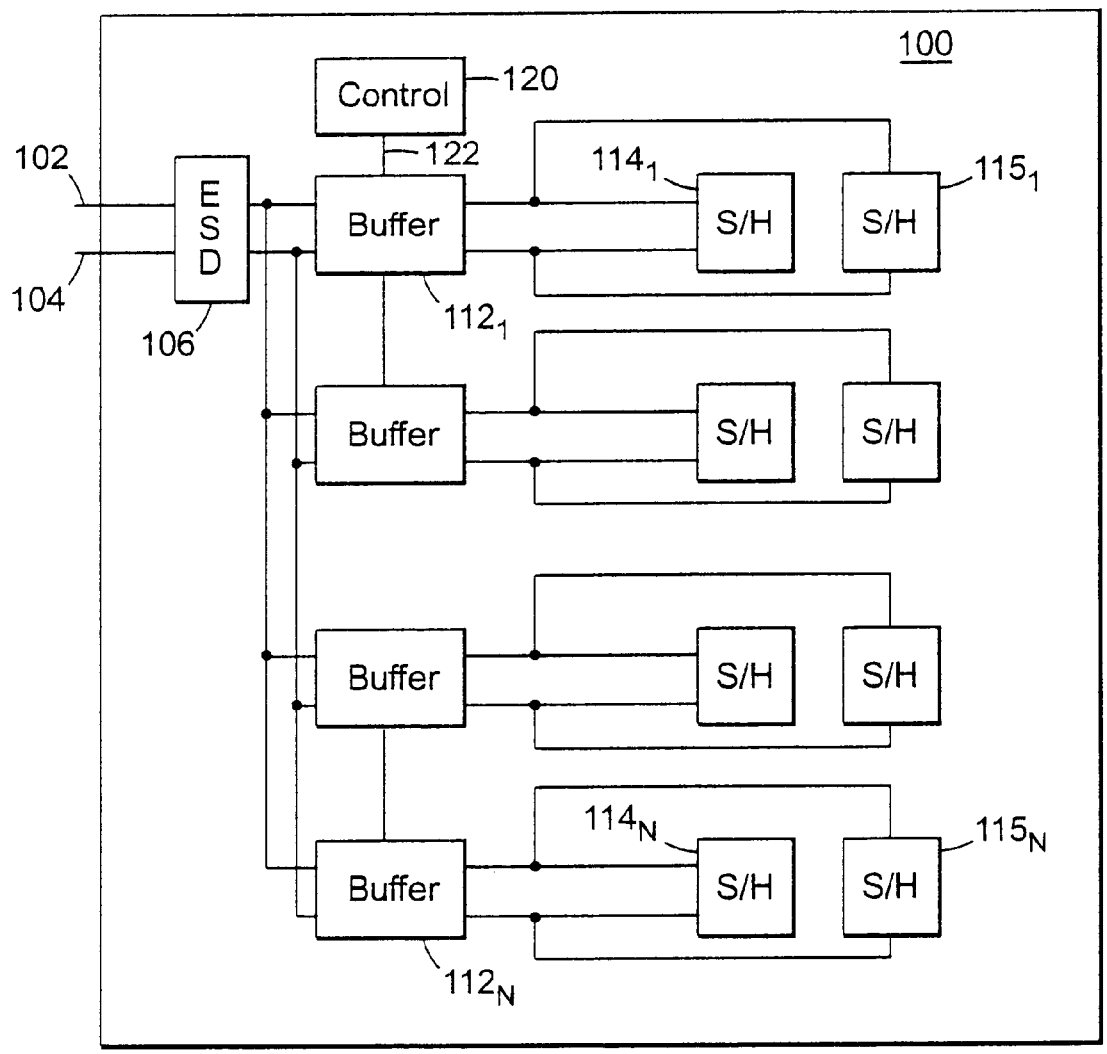
FIG. 2B is an alternate embodiment of the input buffers and corresponding sample circuits of FIG. 2A.

FIG. 2A is a more detailed illustration of the input buffers and corresponding sample circuits of FIG. 1. One embodiment of the present invention provides an input buffer circuit 112 (1-N) for each sample-and-hold circuit 114 (1-N). In an alternate embodiment, the input buffers 112 drive multiple sample and hold circuits 114 (1-N) and 115 (1-N), see FIG. 2B. The buffers can be selectively activated, or placed in a stand-by mode, to reduce average buffer current requirements. A control circuit 120 is coupled to the buffers to provide a stand-by signal on line 122 that selectively deactivates the buffers. Table 1 provides an example pattern where two of ten buffers are active during any given sequence. That is, two buffers are active (A) to sample incoming data signals and the remaining eight buffers are in a standby (SB) mode. It will be appreciated by those skilled in the art, with the benefit of the present description, that selectively disabling the input buffers reduces the total current needed to drive input data signals.

A bias transistor 212 is also coupled to the sources of the transistor pair. This transistor is used to maintain a small bias, or trickle current, on the transistor pair during standby. This transistor can also be referred to as a trickle current transistor. Transistor 214 is provided to selectively couple the gate of tail current transistor 208 to ground to turn off the transistor in response to enable signal 216. Likewise, transistor 220 is coupled to selectively couple the gate of the trickle current transistor 212 to ground in response to enable signal 216. The gate bias of the tail current transistor is established by bias transistor 222 and a bias current 224 coupled to its drain. The bias current, therefore, establishes the sum current conducted through both of the differential transistors 202 and 204. The bias current is also coupled to

TABLE 1

| Sequence | Buffer 1 | Buffer 2 | Buffer 3 | Buffer 4 | Buffer 5 | Buffer 6 | Buffer 7 | Buffer 8 | Buffer 9 | Buffer 10 |
|---|---|---|---|---|---|---|---|---|---|---|
| 1  | A  | A  | SB | SB | SB | SB | SB | SB | SB | SB |
| 2  | SB | A  | A  | SB | SB | SB | SB | SB | SB | SB |
| 3  | SB | SB | A  | A  | SB | SB | SB | SB | SB | SB |
| 4  | SB | SB | SB | A  | A  | SB | SB | SB | SB | SB |
| 5  | SB | SB | SB | SB | A  | A  | SB | SB | SB | SB |
| 6  | SB | SB | SB | SB | SB | A  | A  | SB | SB | SB |
| 7  | SB | SB | SB | SB | SB | SB | A  | A  | SB | SB |
| 8  | SB | SB | SB | SB | SB | SB | SB | A  | A  | SB |
| 9  | SB | SB | SB | SB | SB | SB | SB | SB | A  | A  |
| 10 | A  | SB | SB | SB | SB | SB | SB | SB | SB | A  |

Figure 3:
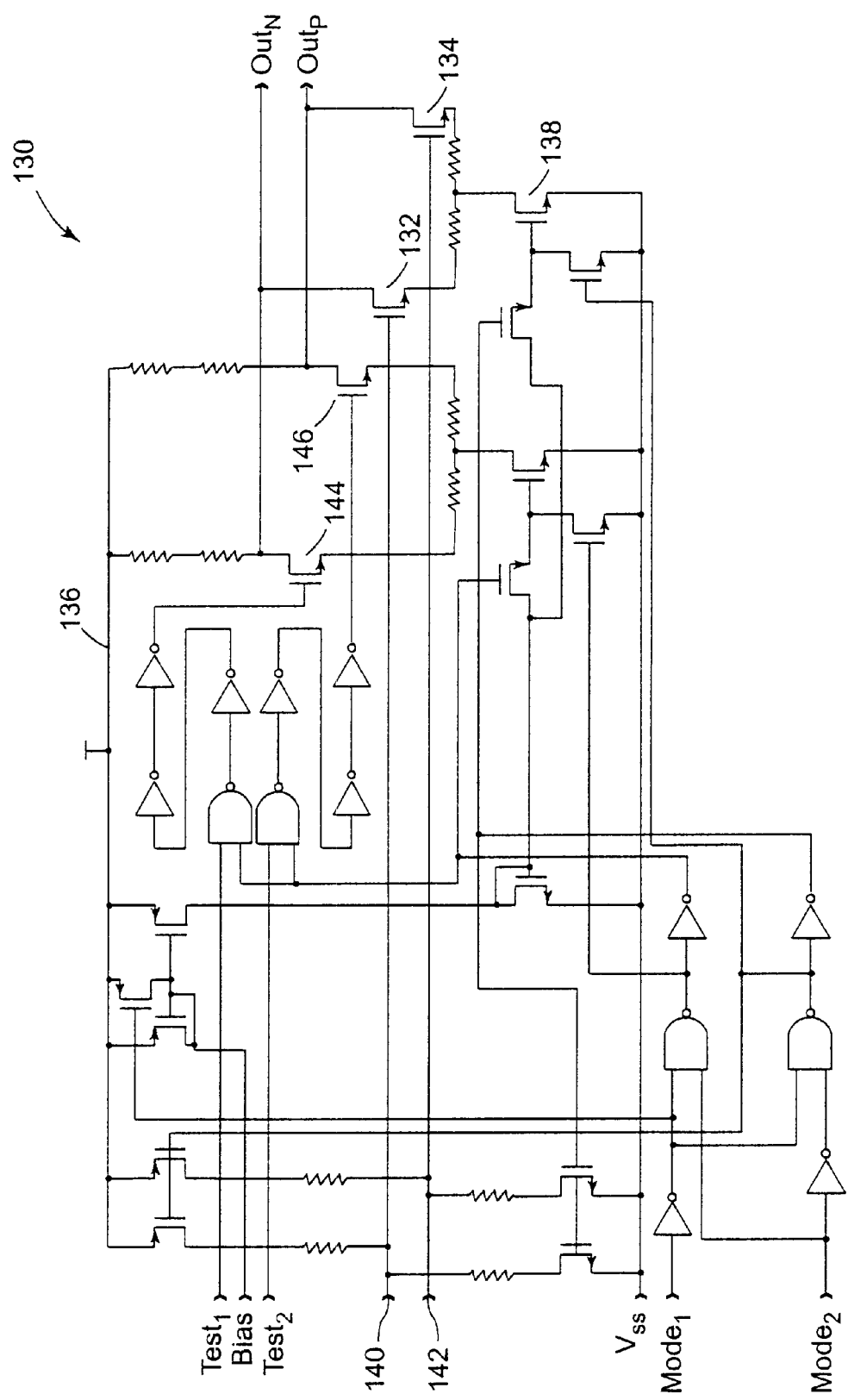
FIG. 3 illustrates a schematic diagram of a prior art buffer circuit that cannot be placed in a standby mode.

Prior to describing the present invention in more detail, a buffer is described that does not have a standby mode. Referring to FIG. 3, a schematic diagram of a buffer circuit 130 that cannot be placed in a standby mode is illustrated. The buffer includes a differential pair of transistors 132 and 134. The transistors are coupled in parallel between a Vcc connection 136 and a tail current transistor 138. In operation, the input signals 140 and 142 control the gate voltage differential between the transistor pair. As such, the ratio of the currents conducted by transistors 132 and 134 is adjusted in response to the input signal differential. The output signals are provided at the drain connections of the transistor pair. These output signals drive multiple sample-and-hold circuits (not shown), for example, ten sample circuits. Test and Mode signals are used to turn off transistors 132 and 134 so that test transistors 144 and 146 can be used.

Figure 4A:
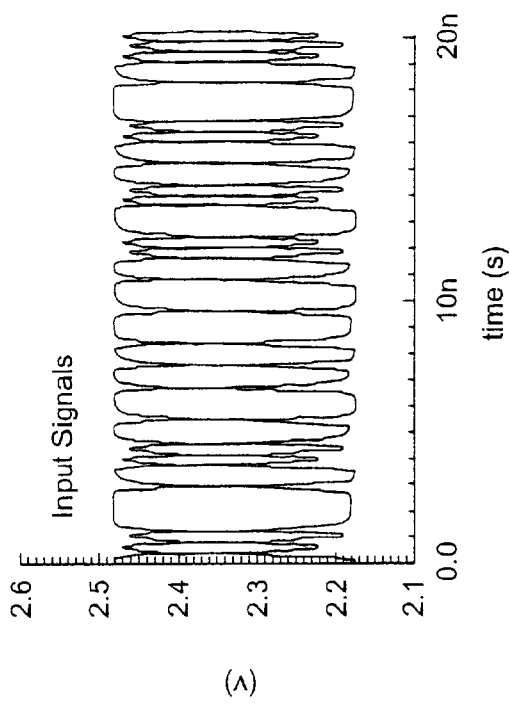
FIGS. 4A and 4B illustrate sample input and output signals of the buffer of FIG. 3.
Figure 4B:
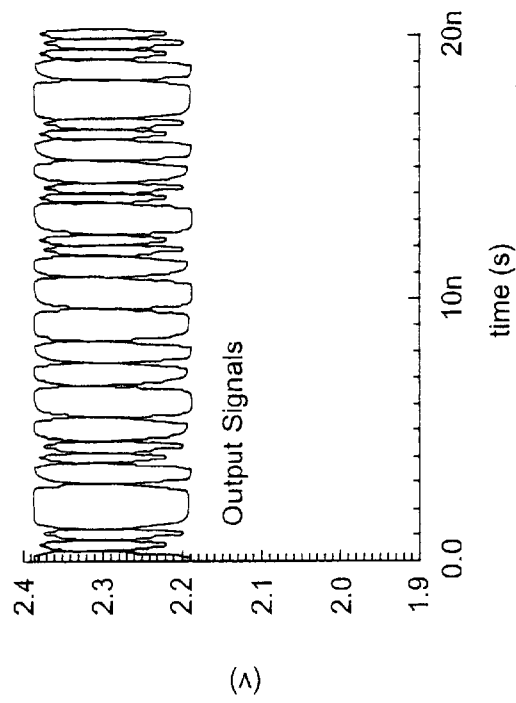

FIGS. 4A and 4B illustrate sample input and output signals of the buffer of FIG. 3. It is noted that the output is always on. That is, the output signal provides a full data waveform over all time periods. As stated above, each of the multiple sample circuits are offset in operation and sample the output of the buffer only periodically. The present invention recognizes that power requirements for driving a buffer during periods when the output signal is not needed can be reduced.

Figure 5:
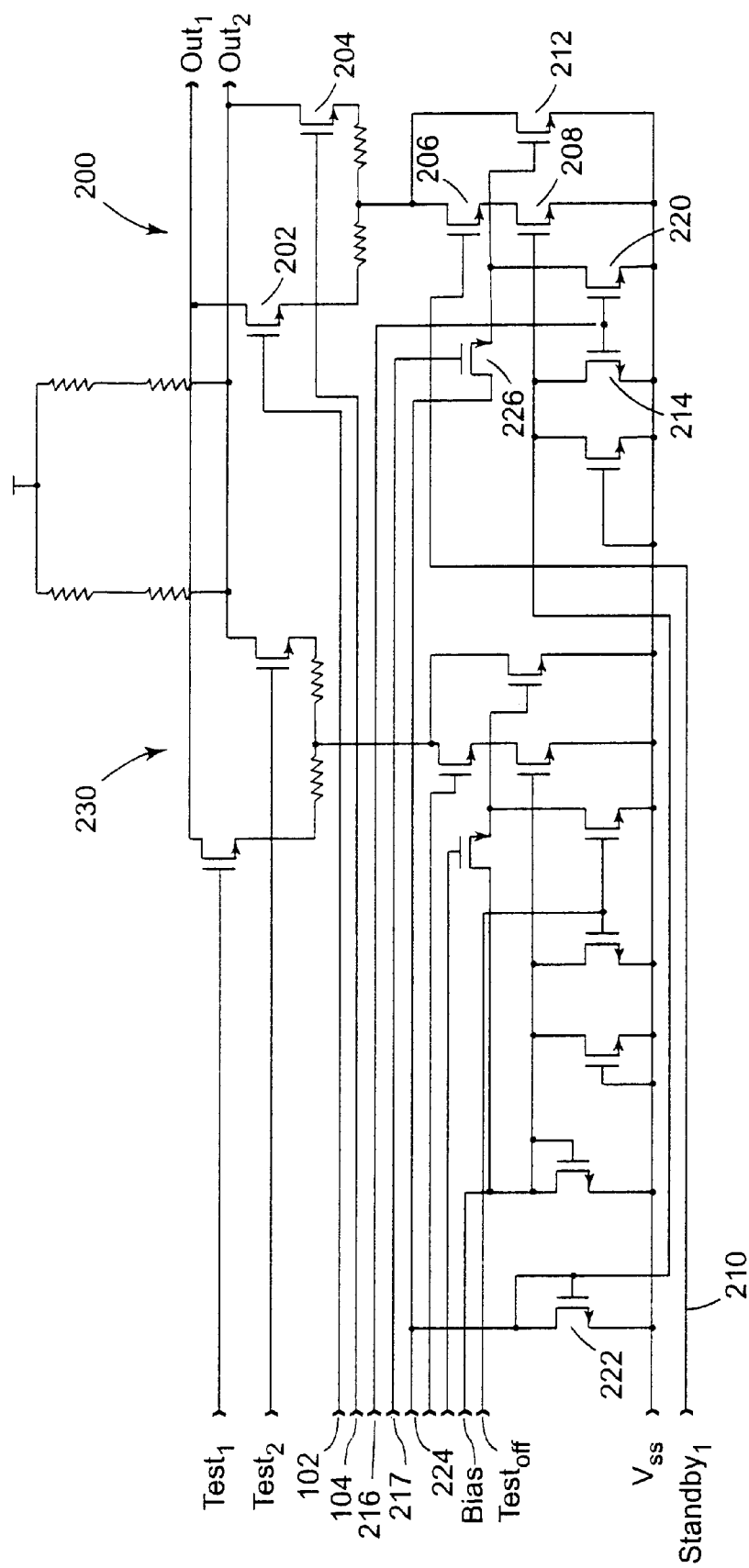
FIG. 5 illustrates an embodiment of a buffer of the present invention.

An embodiment of a buffer 200 of the present invention is described with reference to FIG. 5. The buffer circuit includes a pair of differential transistors 202 and 204, similar to the buffer of FIG. 3. These transistors each have a gate coupled to receive one of the input signals 102 and 104. The sources of the transistors are coupled to a standby transistor 206. The standby transistor is coupled to a tail-current transistor 208. When the standby transistor is activated, the buffer operates in a manner similar to the buffer of FIG. 3. That is, the ratio of currents conducted by each of the differential transistors is controlled in response to the differential of the input signals. The standby transistor is coupled to receive a standby control signal 210. This signal is used to turn off the buffer when the output signal is not desired.

the gate of the trickle current transistor through pass transistor 226 and signal 217. The trickle current transistor size can be selected based upon circuit parameters. In one embodiment, transistor 212 is about 1/10 of the size of the tail current transistor 208.

During operation, the standby transistor 206 is selectively activated when an output is desired from the buffer. When activated, the bias current, and to a lesser degree the trickle current, is conducted through the transistor pair in response to the input signal. This provides corresponding output signals. When the standby transistor is turned off, the current conducted through the transistor pair is reduced to the trickle current. As such, the output signals are essentially turned off.

The tail-current and trickle current transistors can be turned off, using signal 216, to completely disable the buffer. This is desired in the illustrated embodiment when a test buffer 230 is activated. The test buffer is a second buffer coupled in parallel to the above-described buffer. The buffer contains identical components, but is coupled to receive test signal inputs, a separate bias current, and different enable signals. The test buffer can be used to provide a feedback calibration of the buffer circuitry. It will be appreciated that the test buffer is optional and is disabled when the primary buffer is operational.

Figure 6A:
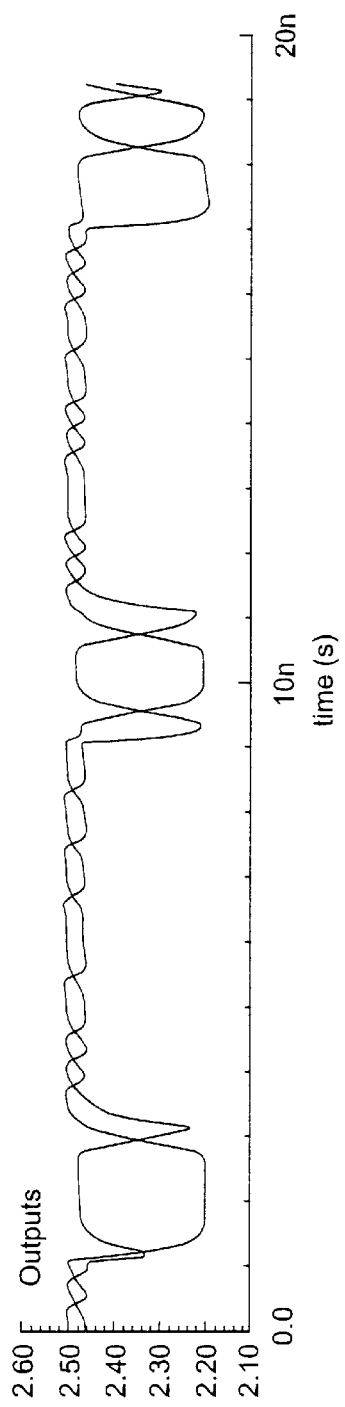
FIGS. 6A, 6B and 6C illustrate timing diagrams of input signals, output signals and the standby signal of the circuitry of FIG. 5.
Figure 6B:
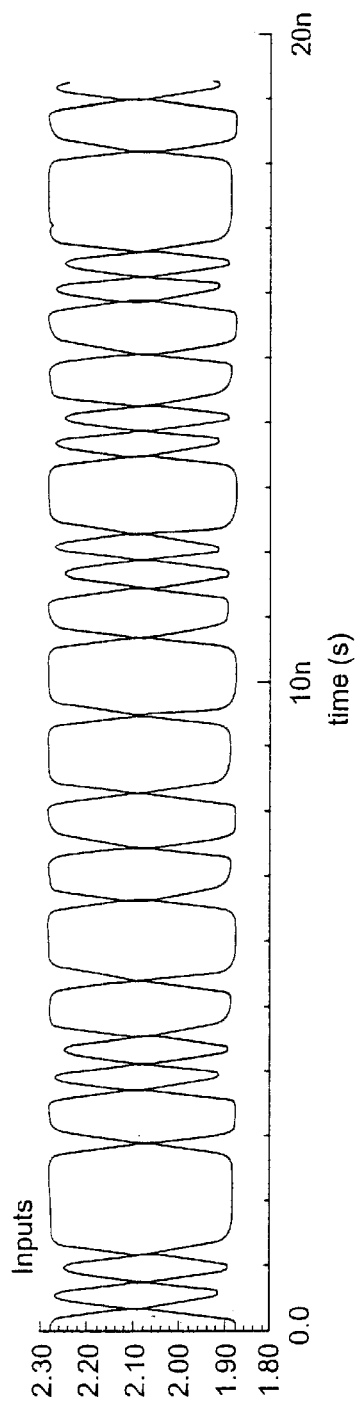
Figure 6C:
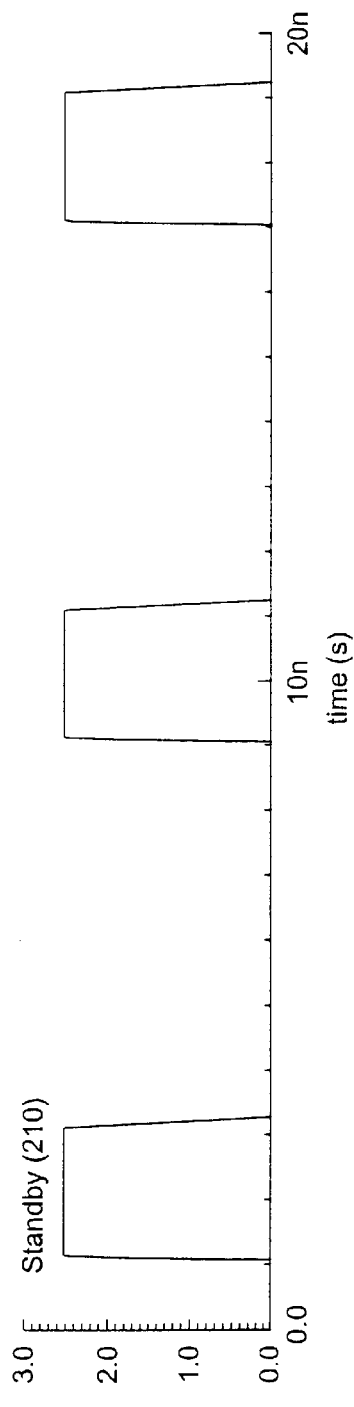

FIGS. 6A, 6B and 6C illustrate timing diagrams of output signals, input signals and the standby signal 210, respectively. When the standby signal is high, the standby transistor is activated and the buffer provides output signals using the bias current. When the standby signal is low and the standby transistor is off, the output signal is provided using the trickle current. Thus, the amplitude of the output signal is substantially reduced. The trickle current keeps the differential transistors active to increase response time when the standby transistor is activated.

CONCLUSION

An integrated circuit input buffer system has been described that includes numerous buffers used to receive input signals. The buffer system controls the buffers in a manner that places some of the buffers in a standby mode while other buffers are active. The present invention, therefore, reduces the capacitive load on any individual buffer. The buffers can be activated in a variety of patterns, such as sequential activation. In one embodiment, the buffers have differential transistors coupled to receive differential input signals. The differential transistors are coupled to conduct a total current defined by a tail current circuit. The buffers are placed in a standby state by electrically isolating the tail current from the differential transistors. In one embodiment, a standby transistor is electrically located between the differential transistors and a tail current transistor. The differential transistors conduct a trickle current during the standby state. Sample-and-hold circuitry is electrically coupled to the buffers to process the input signals.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method of operating an integrated circuit input buffer circuit comprising:
   receiving differential input signals on input connections;
   activating a first buffer circuit coupled to the input connections; and
   placing a second buffer circuit, coupled to the input connections, in a standby state, wherein a current conducted by the second buffer circuit is less than a current conducted by the first buffer circuit;
   wherein placing a second buffer circuit in the standby state comprises electrically isolating a tail current from the second buffer; and
   wherein the first and second buffer circuits each comprises:
   first and second differential transistors coupled to receive the differential input signals,
   a standby transistor electrically coupled between the first and second differential transistors and a lower voltage supply (Vss),
   a tail current transistor electrically coupled between the first and second differential transistors and the lower voltage supply (Vss) to establish an operation current conducted through the first and second differential transistors, and
   a trickle current transistor electrically coupled between the first and second differential transistors and the lower voltage supply (Vss) to establish a trickle current conducted through the first and second differential transistors during the standby state.

2. An integrated circuit comprising:
   input connections to receive first and second input signals;
   a plurality of buffer circuits coupled to the input connections;
   a plurality of sample circuits each coupled to one of the plurality of buffer circuits; and
   control circuitry coupled to the plurality of buffer circuits to selectively place some of the plurality of buffer circuits in a standby state;
   wherein the first and second input signals are complementary signals and each of the buffer circuits comprises:
   first and second differential transistors coupled to receive the first and second input signals, drain regions of the first and second differential transistors are coupled to load resistors;
   a standby transistor electrically coupled to the source regions of the first and second differential transistors; and
   a tail current transistor coupled to the standby transistor to establish a current conducted through the first and second differential transistors during operation.

3. The integrated circuit of claim 2 further comprises a trickle current transistor coupled to the source regions of the first and second differential transistors to establish a current conducted through the first and second differential transistors during the standby state.

4. The integrated circuit of claim 3 wherein the trickle current transistor is smaller than the tail current transistor, such that the trickle current transistor conducts less current than the tail current transistor.

5. An integrated circuit comprising:
   differential input connections to receive first and second input signals;
   electrostatic discharge protection circuitry coupled to the differential input connections;
   first and second buffer circuits coupled to the differential input connections;
   first and second sample circuits respectively coupled to the first and second buffer circuits; and
   control circuitry coupled to the first and second buffer circuits to selectively place either the first or second buffer circuit in a standby state;
   wherein the first and second buffer circuits each comprises:
   first and second differential transistors coupled to receive the first and second input signals, drain regions of the first and second differential transistors are coupled to load resistors;
   a standby transistor electrically coupled to the source regions of the first and second differential transistors;
   a tail current transistor coupled to the standby transistor to establish an operation current conducted through the first and second differential transistors; and
   a trickle current transistor coupled to the source regions of the first and second differential transistors to establish a trickle current conducted through the first and second differential transistors during the standby state.

6. The integrated circuit of claim 5 further comprises:
   a first bias circuit coupled to a gate of the tail current transistor; and
   a second bias circuit coupled to a gate of the trickle current transistor.

7. The integrated circuit of claim 6 wherein the trickle current is less than the operation current.

8. The integrated circuit of claim 6 wherein the trickle current transistor is smaller than the tail current transistor.

9. An integrated circuit comprising:
   differential input connections to receive first and second input signals;
   a buffer circuit coupled to the differential input connections, wherein the buffer circuit comprises:
   first and second differential transistors coupled to receive the first and second input signals,
   a standby transistor electrically coupled between the first and second differential transistors and a lower voltage supply (Vss),
   a tail current transistor electrically coupled between the first and second differential transistors and the lower voltage supply (Vss) to establish an operation current conducted through the first and second differential transistors, and a trickle current transistor electrically coupled between the first and second differential transistors and the lower voltage supply (Vss) to establish a trickle current conducted through the first and second differential transistors during the standby state; and control circuitry coupled to the first and second buffer circuits to selectively activate the standby transistor of the buffer circuit.

10. An integrated circuit comprising:

differential input connections to receive first and second input signals;

a plurality of differential input buffer circuits coupled to the differential input connections;

a plurality of sample circuits each coupled to one of the plurality of differential input buffer circuits; and control circuitry coupled to the plurality of buffer circuits to selectively place some of the differential input buffer circuits in a standby state and others of the differential input buffer circuits in an active state, wherein the differential input buffer circuits conduct less current in the standby state than the active state;

wherein the plurality of buffer circuits each comprise:

first and second differential transistors coupled to receive the first and second input signals, drain regions of the first and second differential transistors are coupled to an upper voltage supply (Vdd) through respective first and second load resistors;

third and fourth resistors respectively coupled to the source regions of the first and second differential transistors;

a standby transistor electrically coupled between the third and fourth resistors and a lower voltage supply (Vss);

a tail current transistor electrically coupled between the third and fourth resistors and the lower voltage supply (Vss) to establish an operation current conducted through the first and second differential transistors; and a trickle current transistor electrically coupled between the third and fourth resistors and the lower voltage supply (Vss) to establish a trickle current conducted through the first and second differential transistors during the standby state.

11. An integrated circuit comprising:

differential input connections to receive first and second input signals;

a buffer circuit coupled to the differential input connections, wherein the buffer circuit comprises:

first and second differential transistors coupled to receive the first and second input signals, drain regions of the first and second differential transistors are coupled to an upper voltage supply (Vdd) through respective first and second load resistors, third and fourth resistors respectively coupled to the source regions of the first and second differential transistors, a standby transistor electrically coupled between the third and fourth resistors and a lower voltage supply (Vss), a tail current transistor electrically coupled between the third and fourth resistors and the lower voltage supply (Vss) to establish an operation current conducted through the first and second differential transistors, and a trickle current transistor electrically coupled between the third and fourth resistors and the lower voltage supply (Vss) to establish a trickle current conducted through the first and second differential transistors during the standby state; and control circuitry coupled to the first and second buffer circuits to selectively activate the standby transistor of the buffer circuit.

12. A method of operating an integrated circuit input buffer circuit comprising:

receiving differential input signals on input connections;

coupling the differential input signals to a plurality of buffer circuits;

sequentially activating at least one of the plurality of buffer circuits, such that remaining ones of the plurality of buffer circuits are placed in a standby state, wherein a standby current conducted by the buffer circuits in the standby state is less than an operating current conducted by the activated buffer circuits;

wherein the operating current comprises a tail current and the standby current.

13. The method of claim 12 wherein the remaining ones of the plurality of buffer circuits are placed in the standby state by electrically isolating the tail current.

14. An integrated circuit comprising:

differential input connections to receive first and second input signals;

electrostatic discharge protection circuitry coupled to the differential input connections;

first and second buffer circuits coupled to the differential input connections;

first and second plurality of sample circuits respectively coupled to the first and second buffer circuits; and control circuitry coupled to the first and second buffer circuits to selectively place either the first or second buffer circuit in a standby state;

wherein the first and second buffer circuits each comprises:

first and second differential transistors coupled to receive the first and second input signals, drain regions of the first and second differential transistors are coupled to load resistors;

a standby transistor electrically coupled to the source regions of the first and second differential transistors;

a tail current transistor coupled to the standby transistor to establish an operation current conducted through the first and second differential transistors; and a trickle current transistor coupled to the source regions of the first and second differential transistors to establish a trickle current conducted through the first and second differential transistors during the standby state.

15. The integrated circuit of claim 14 further comprises:

a first bias circuit coupled to a gate of the tail current transistor; and a second bias circuit coupled to a gate of the trickle current transistor.

16. The integrated circuit of claim 15 wherein the trickle current transistor is smaller than the tail current transistor.

17. The integrated circuit of claim 15 wherein the trickle current is less than the operation current.

* * * * *